UNITED STATES PATENT OFFICE.

EUGEN SCHAAL AND MAX SCHAAL, OF FEUERBACH, GERMANY.

PROCESS OF HARDENING ROSIN.

SPECIFICATION forming part of Letters Patent No. 698,741, dated April 29, 1902.

Application filed May 5, 1900. Serial No. 15,634. (No specimens.)

*To all whom it may concern:*

Be it known that we, EUGEN SCHAAL and MAX SCHAAL, chemists and doctors of philosophy, subjects of the King of Würtemberg, residing at Feuerbach, in the Kingdom of Würtemberg, in the German Empire, have invented a certain new and useful Process of Manufacturing a Substitute Product for Gum-Copal and Amber from other Resinous Bodies, of which the following is a specification.

This invention has reference to means by which it is possible to obtain from the low-priced colophony or rosin of commerce substitution products which may replace the far more expensive amber and the gum-copals derived from tropical sources in all the uses to which they are put in the various processes of manufacture, especially in the manufacture of japans and varnishes.

Our process is particularly distinguished by subjecting the colophony in a state of very fine mechanical subdivision obtained by any suitable means, by powdering or otherwise, to the action of oxygen. The purpose to be attained by this treatment is to effect a raising of the melting-point of the rosin to such a degree that it will be near or even reach that of gum-copal or amber. This will also result in imparting copal-like properties to the rosin in other respects. Thus after the rosin has undergone the treatment with oxygen for a sufficient length of time it will show the singular quality common to both gum-copal and amber that oil of turpentine and fatty oils will effect a perfect solution only after subjecting the product to a melting process of sufficient degree or intensity.

It will be evident that by our process a considerably cheaper substitution product for the more expensive hard rosins of nature, of which gum-copals and amber are an instance, will be obtained having approximately identical properties. We prefer to carry on the treatment with oxygen at an elevated temperature, which, however, in keeping with the general features of the process, should be kept below the melting-point of the resinous body to which the invention happens to be applied. We may use also oxygen in the form of ozone, either alone or in mixture with indifferent gases. The cheapest source of oxygen will be afforded by atmospheric air.

In order to carry out our invention, we may, by way of example, proceed as follows: Upon a thin layer of powdered rosin a current of air is passed at gradually-rising temperature, which, however, should not reach the melting-point of the resinous body, until no further perceptible rise of the melting-point is noticed, which may be ascertained by suitable tests. The product thus obtained is distinguished from the raw material serving for its preparation by its considerably-elevated melting-point and will only imperfectly dissolve in oil of turpentine. Just as copal, it will become soluble in oil of turpentine and in fatty oils by a suitable melting process, which, just as in the case of gum-copal and amber, will be accompanied by considerable frothing. This hardened rosin may then be further treated in the same manner as gum-copal or amber and be used in the same way as those; or we may still further raise the melting-point by submitting the product to another melting process similar to that employed for amber and subsequently powdering the material and again treating it to the process just described.

This process, as may be expected, does not only apply to rosin, being the free resinous acid, but also to its various more or less saturated combinations with magnesia, lime, alumina, zinc, manganese, lead, as well as with glycerin, glucose, levulose, cane-sugar or mixtures thereof, all of which combinations are used in the manufacture of japans and varnishes. It is evident that the process does not exclude the use of other combinations of rosin with metal oxids or with alcoholic bodies. The resinous bodies and their combinations and derivatives may also be subjected to the process when mechanically diluted by various solid substances—such as powdered talc, salt, chlorate of potash, boric acid, and similar materials—which diminish the tendency of the rosin to stick and facilitate its reduction to powder. The adaptability of the oxidized rosin or rosin compounds is increased by saturating any free resinous acid it may contain by treatment with a suitable agent capable of combination with resinous acids.

The products resulting from the treatment of the above-mentioned resinous bodies with oxygen may be used for any industrial purpose for which heretofore the hard rosins of nature had to be employed.

What we claim, and desire to secure by Letters Patent of the United States, is—

1. The process of manufacturing high melting substitutes for the hard rosins of nature which consists in treating rosin and rosin compounds in a state of very fine mechanical subdivision with oxygen gas in any suitable gaseous form or condition and at a temperature approximating to and not reaching the melting-point of the resinous body under treatment and then saturating any remaining acid principle by treatment with a suitable agent capable of combination with resinous acids.

2. The process of treating rosin and rosin compounds which consists in subjecting rosin and rosin compounds in a state of very fine mechanical subdivision to the action of oxygen gas at a temperature approximating to and not reaching the melting-point of the rosin under treatment, substantially as described.

3. The process of treating rosin which consists in powdering the rosin, and passing a current of air over it at a gradually-rising temperature which approximates but does not reach the melting-point of the rosin under treatment, substantially as described.

4. As a new article of manufacture, a copal-like body, obtained from rosin and rosin compounds and hardened by gaseous oxygen, substantially as described.

In witness whereof we have hereunto signed our names in the presence of two subscribing witnesses.

EUGEN SCHAAL.
MAX SCHAAL.

Witnesses:
HERMANN WAGNER,
ANDREAS HIEDAISCH.